United States Patent [19]

Carpenter et al.

[11] Patent Number: 5,367,971
[45] Date of Patent: Nov. 29, 1994

[54] TOWED ACOUSTIC ARRAY

[75] Inventors: Allan L. Carpenter, Surrey Downs; Raymond F. Farmer, Eden Hills, both of Australia

[73] Assignee: Australian Sonar Systems Pty Ltd., Technology Park, Australia

[21] Appl. No.: 27,945

[22] Filed: Mar. 8, 1993

[30] Foreign Application Priority Data

Mar. 12, 1992 [AU] Australia ................. PL1309

[51] Int. Cl.$^5$ .............................. F15D 1/10
[52] U.S. Cl. ............................ 114/243; 114/244
[58] Field of Search ............... 174/115, 105 R, 126.2, 174/131 R, 120 R, 119 R, 117 R; 114/243, 253, 244, 242; 385/102, 103, 104, 107

[56] References Cited

U.S. PATENT DOCUMENTS

| | | | |
|---|---|---|---|
| 3,344,888 | 10/1967 | Connelly et al. | 174/131 R |
| 3,859,949 | 1/1975 | Toussaint et al. | 114/243 |
| 4,081,602 | 3/1978 | Paniri et al. | 174/117 R |
| 5,214,244 | 5/1993 | Cummings et al. | 114/243 |

FOREIGN PATENT DOCUMENTS

| | | | |
|---|---|---|---|
| 3933398 | 4/1991 | Germany | 114/243 |
| 2254592 | 10/1992 | United Kingdom | 114/243 |

Primary Examiner—Edwin L. Swinehart
Attorney, Agent, or Firm—Oblon, Spivak, McClelland, Maier & Neustadt

[57] ABSTRACT

A tow cable includes a high density, high damping core of a material such as lead, surrounded by a layer of helically wrapped or braided strength fibers of a material such as steel, or alternatively, of aramid fibers. Over this is provided a layer of a resilient, deformable thermoplastic material such as polyurethane, to provide for movement of the subsequent data-bearer layer under strain, so that no strain is applied to the data-bearer themselves. Around this layer is provided a layer of helically wrapped (or braided) power and data bearers, the bearers including coaxial cables, twisted pairs, and fiber optic bearers. To ensure water-blocking, this layer may be enclosed in an extrusion of thermoplastic material, such as polyurethane. Around this is wrapped or braided a layer of protective fiber, of material such as steel or aramid fiber, and over this, in a roughly trochoidal cross-section, is extruded an outer layer of thermoplastic material, such as polyurethane. The trochoidal cross section is twisted along the length of the cable. This twisting of the trochoidal section causes the ridges to effectively rotate as the cable moves through water and therefore minimizes vortex shedding and cable strumming.

15 Claims, 1 Drawing Sheet

TOWED ACOUSTIC ARRAY

BACKGROUND OF THE INVENTION

1. Field of the Invention

This invention relates to tow cables for towed acoustic arrays.

2. Discussion of the Background

Conventional towed arrays, or streamers, have consisted of towing cable, which must be negatively buoyant to achieve submersion to the required depth, a forward Vibration Isolation Module (VIM) to minimize the transmission of mechanical vibration from the tow cable to the acoustic array, an array of acoustic (and non-acoustic) sensors, and an aft VIM to minimize transmission of vibration from the 'flapping tail' forward to the acoustic array.

This invention relates to the construction and form of the tow cable which links the towing vessel to the head of the acoustic streamer and, through its density, determines the depth at which the streamer is towed.

Conventional tow cables have typically comprised a multicore inner portion, surrounded by several layers of helically wound steel armoring which provides the required density, tensile strength for towing, and extreme robustness to resist the rigors of handling during deployment and retrieval operations. Regretfully, this construction has also brought disadvantages, including the limitations of limited flexibility (large bend radius), a relatively large diameter (to achieve the target specific gravity of 3 or more) and, with the normal circular section, a low resistance to excitation into strumming by periodic vortex shedding—a problem usually treated by the addition of difficult-to-handle 'flags' along the cable length. The dominance of the cable's mechanical characteristics by the steel armoring results in very little internal damping to attenuate any periodic cable strumming that is excited.

BRIEF SUMMARY OF THE INVENTION

It is an object of the present invention to try to provide measures to address at least three of the above problem areas:
 a. cable size,
 b. the lack of damping inherent in the cable structure, and
 c. cable form, and its sensitivity to strumming.

Accordingly, in one aspect, the invention provides a tow cable for acoustic arrays, the tow cable comprising:
 a. an inner core of relatively high density, high damping material,
 b. a covering of high tensile strength surrounding the core, and
 c. at least one layer of resiliently deformable material of high internal damping surrounding the high tensile covering,
 wherein the exterior surface of the tow cable is provided with at least one longitudinally extending inflection which extends along a helical or twisted path along the cable.

In a preferred embodiment of the invention, the exterior surface of the tow cable comprises at least two longitudinally extending surfaces which intersect each other longitudinally. The longitudinally extending surfaces can be either curved or flat. The inflection can be either a ridge or a groove. In a preferred embodiment, there are three longitudinally extending curved surfaces which intersect to form three longitudinal ridges.

In a preferred embodiment, strength members and data transmission members are provided surrounded by one or more of the layers of resiliently deformable material of high internal damping.

In a further aspect of the present invention, there is provided a tow cable suitable for incorporating into a towed array streamer, comprising;
 a. a central core of relatively high density, high damping material,
 b. a helically wrapped or braided layer of fibers of high tensile strength,
 c. a layer of deformable resilient material,
 d. a layer of helically wrapped or braided cables for power and data transmission,
 e. a layer of helically wrapped or braided fibers to provide a protective armoring for the power/data cable layer, and
 f. an outer extrusion of thermoplastic material in an approximately triangular or trochoidal form is subjected to a regular twist. to present a changing form along the cable to the cross flow, thereby further minimizing the chance of any local areas of instability being established. However, it will be appreciated that forms other than triangular or trochoidal could be utilized.

Preferably, the power/data cable layer is enclosed in an extrusion of thermoplastic material. In one preferred embodiment the central core is made of lead.

In the above embodiment the three identified performance aspects have been addressed—size is reduced by the use of high density materials, damping is increased by the use of materials with high internal damping qualities and the form chosen is insensitive to vortex shedding, thereby minimizing the initiation of the forcing function for cable strumming.

BRIEF DESCRIPTION OF THE DRAWINGS

Various embodiments of the invention will now be described more fully, by way of example, with reference to the drawings, of which;

FIGS. 3(a)–(f) schematically illustrate a number of other possible profiles of the exterior surface of the cable wherein:

FIG. 3(a) shows a cable having a single ridge;
FIG. 3(b) shows a cable having a single groove;
FIG. 3(c) shows a cable having two ridges;
FIG. 3(d) shows a cable having a square cross-section;
FIG. 3(e) shows a cable having five ridges and five concave surfaces; and
FIG. 3(f) shows a cable having three ridges and one concave surface.

DETAILED DESCRIPTION OF THE EMBODIMENTS

Figure 1:
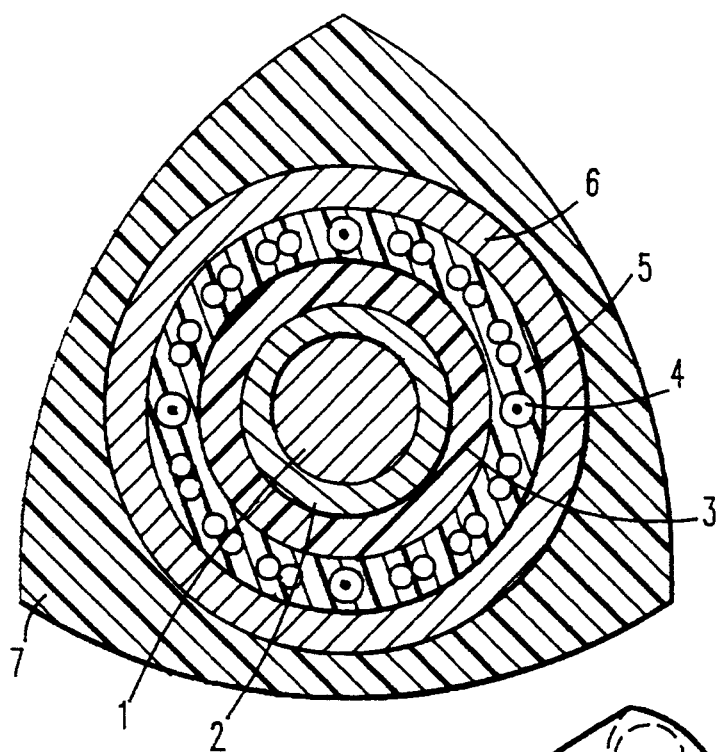
FIG. 1 schematically illustrates one possible cross-section of implementation.

As shown in FIG. 1, one aspect of a preferred embodiment involves the provision of a high density, high damping core of a material such as lead (1), surrounded by a layer of helically wrapped or braided strength fibers of a material such as steel (2), (or alternatively, of aramid fibers). Over this is provided a layer of a resilient, deformable thermoplastic material such as polyurethane (3), to provide for movement of the subsequent data-bearer layer under strain, so that no strain is applied to the data-bearers themselves. Around this layer (3) is provided a layer of helically wrapped (or braided) power and data bearers (4), comprising bearers including coaxial cables, twisted pairs, and fiber optic bearers. To ensure water-blocking, this layer may be enclosed in an extrusion of thermoplastic material (5), such as polyurethane. Around this is wrapped or braided a layer of protective fibers (6), of material such as steel or aramid fibre, and over this, in a roughly trochoidal cross-section, is extruded an outer layer of thermoplastic material (7), such as polyurethane.

Figure 2:
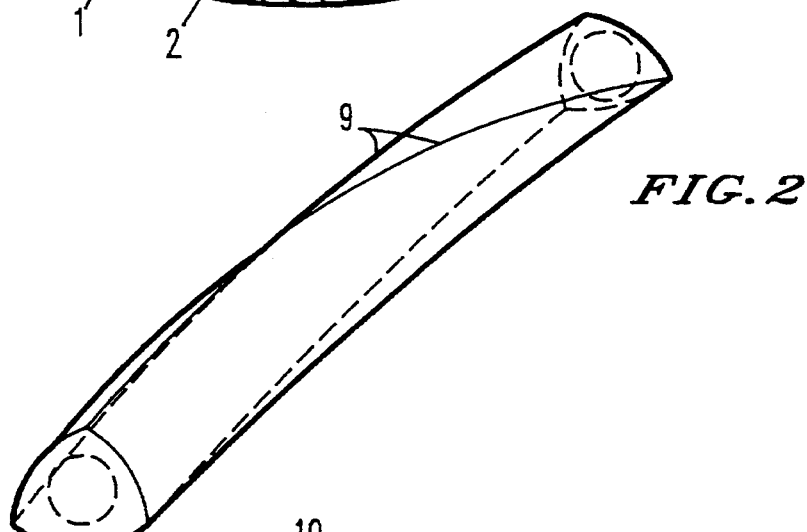
FIG. 2 schematically illustrates the proposed longitudinal twist of the trochoidal cross-section.

FIG. 2 shows the extruded cable, illustrating the trochoidal cross section (8), and the twist of this section along the length (9) of the cable. This twisting of the trochoidal section causes the ridges to effectively rotate as the cable moves through water and therefore minimizes vortex shedding and cable strumming.

Figure 3A:
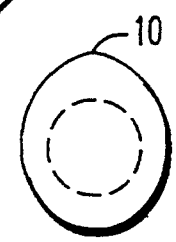
Figure 3B:
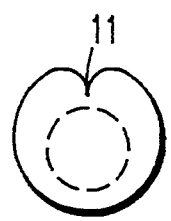
Figure 3C:
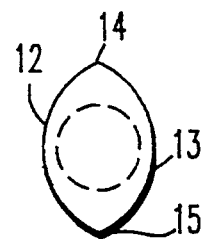
Figure 3D:
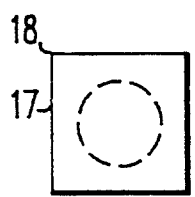
Figure 3E:
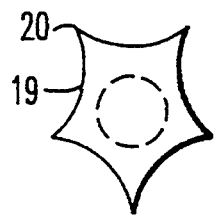
Figure 3F:
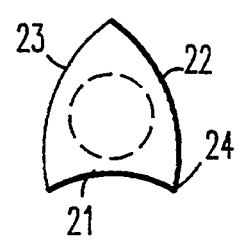

FIG. 3(a) to (f) shows a number of other cross-sectional shapes which could be used for the exterior of the cable. FIG. 3(a) shows a cable having a substantially circular cross-sectional shape but having a single inflection or ridge (10). In FIG. 3(b), the cable is again of substantially circular shape, but having a groove (12) in place of the ridge (11) of FIG. 3(a). FIG. 3(c) shows a cable whose exterior surface is formed by two curved surfaces (13) and (14) intersecting at two ridges (15) and (16). In FIG. 3(d), the exterior shape of the cable is that of a square having four sides (17) intersecting to form four ridges (18). FIG. 3(e) shows a cable having an exterior surface composed of a number of concavely curved surfaces (19), which intersect to provide ridges (20). Finally, in FIG. 3(f) there is shown a cable whose exterior surface is formed by a concavely curving surface (21) and two convexly curving surfaces (22) and (23) which intersect to provide three ridges (24). It will be appreciated that various other shapes of the exterior surface could be provided without departing from the scope of the invention. It will also be appreciated that in each case, the shape is preferably twisted along the length of the cable.

The foregoing describes only some aspects of the present invention, and modifications obvious to those skilled in the art can be made without departing from the scope of the present invention.

What we claim is:

1. A tow cable for acoustic arrays, the two cable comprising:
   an inner core of relatively high density, high damping material,
   a covering of high tensile strength surrounding the core, and
   at least one layer of resiliently deformable material of high internal damping surrounding the high tensile covering,
   wherein the exterior surface of the tow cable is provided with at least one longitudinally extending inflection which extends along one of a helical path and a twisted path along the cable.

2. A tow cable according to claim 1, wherein the exterior surface of the tow cable comprises at least two longitudinally extending surfaces which intersect each other longitudinally.

3. A tow cable according to claim 2, wherein the at least one longitudinally extending inflection is curved in a direction which is perpendicular to the longitudinal axis of the tow cable.

4. A tow cable according to claim 2, wherein the longitudinally extending surfaces are flat.

5. A tow cable according to any one of claims 1 to 4, wherein the at least one inflection is a longitudinally extending ridge.

6. A tow cable according to any one of claims 1 to 4, wherein the at least one inflection is a longitudinally extending groove.

7. A tow cable according to claim 1, wherein the exterior surface has three longitudinally extending curved surfaces which intersect to form three longitudinal ridges, wherein one of said three longitudinal ridges comprises said at least one inflection, and wherein the remaining two of said three longitudinal ridges comprise two further inflections.

8. A tow cable according to any one of claims 1 to 4, which comprises: strength members and data transmission members surrounded by at least one of the at least one layer of resiliently deformable material of high internal damping.

9. A tow cable suitable for incorporating into a towed array streamer, the cable comprising:
   a central core of relatively high density, high damping material,
   one of a helical wrapped layer of fibers and a braided layer of fibers of high tensile strength,
   a layer of deformable resilient material,
   one of a layer of helically wrapped and a layer of braided cables for power and data transmission,
   a layer of protective fibers to provide a protective armoring for the power/data cable layer, and
   an outer extrusion of thermoplastic material having three longitudinally extending ridges, the three longitudinally extending ridges being twisted along the tow cables as to present a changing form to the cross flow.

10. A tow cable according to claim 9, wherein the power data cable layer is enclosed in an extrusion of thermoplastic material.

11. A tow cable according to claim 9, wherein the central core is made of lead.

12. A tow cable according to claim 10, wherein said outer extension has a cross section which is of an approximately triangular shape.

13. A tow cable according to claim 10, wherein said outer extension has a cross section which is of an approximately trochoidal shape.

14. A tow cable according to claim 10, wherein said layer of protective fibers comprises helically wrapped fibers.

15. A tow cable according to claim 10, wherein said layer of protective fibers comprises braided fibers.

* * * * *